Patented May 21, 1940

2,201,143

UNITED STATES PATENT OFFICE 2,201,143

PROCESS FOR PRODUCING WHITE CEMENT

Otto Schwachheim, Leimen, near Heidelberg, Germany

No Drawing. Application June 21, 1938, Serial No. 215,063. In Germany March 25, 1936

3 Claims. (Cl. 106—25)

This invention relates to a process for producing white cement.

It has been proposed already to produce cement of white color from colored raw materials for instance such as contain sodium compounds or iron. It has been suggested to treat the clinkers after sintering with carbonic acid to destroy the coloring sodium compounds, or to reduce the iron oxides contained in the raw material to metal and then to separate the latter by magnets from the coarsely ground raw material. It is known to render the iron content of raw materials harmless by adding to the latter for instance phosphates or borates which combine with the coloring constituents of the raw products to form a colorless fusion. There are also processes known for converting the iron into a volatile chlorine compound by the addition of suitable substances which give off chlorine, as the metallic chlorides or hydrochloric acid. The chlorides mostly in use, as NaCl, KCl, CaCl₂, are however, not suited for practical purposes, since the chlorine component volatilizes before combining with the iron to form iron chloride, particularly with respect to NaCl and KCl, and, for instance in case of CaCl₂, the chlorine separates only at a temperature at which the raw material is sintering already. The result is that the iron constituents do not combine any more with the chlorine but remain in the sintered material and impart to the cement the undesirable color. The known use of zinc chloride cannot be considered for the purposes of the invention, as it is so expensive that for this reason alone it is out of the question. It furthermore unfavorably influences the setting time of the cement. The use of hydrochloric acid involves the drawback that it partly evaporates instantly without any effect and that partly CaCl₂ is formed immediately the defects of which have been mentioned.

Compared with the known art, the invention consists in adding to the raw material chloride of lime as chlorine separating substance, heating the mixture in known manner in a reducing atmosphere until sintering occurs and then cooling the mixture while excluding air. It is further possible to treat the raw material with chlorine gas in a preliminary manner. The application of the invention insures the conversion of the content of iron compounds which cause the coloring of the clinker into chlorine compounds and volatilization of the latter. This process affords the considerable advantage that the chlorine separating substance is cheap and easily to be had. Clinkers or cement produced according to this process show a beautiful pure white color which could not be attained hitherto by the known processes. A flux may be added to the raw material, though this is not absolutely necessary when chloride of lime is used according to the invention. Burning is easily effected, and failures are practically eliminated. It has been found that the amount of chloride of lime required to be added may be reduced if there be added to the raw material a small quantity of selenium proportionate to the iron-content of the raw material. In addition, alkali chlorides may also be added with the selenium in small amounts.

By reason of these additions the quality of the white cement produced is still further improved, both as regards the brightness of the color and as regards the uniformity of the final product.

The following examples have been found to give satisfactory results:

Example 1

A raw material having a content of 75% carbonate of lime is produced by mixing and grinding sand, clay and lime. To the material thus formed a slight quantity of a flux, for instance fluor spar to the extent of, say 2%, may be simultaneously added, though this is not absolutely necessary. The material is then mixed with approximately 2% to 5% chloride of lime, moistened with water, granulated and normally baked in a reducing atmosphere. The clinker produced in this manner while air is excluded is pure white.

Example 2

The raw material, produced by mixing and grinding sand, clay and lime and to which a flux may be added in the usual manner, has admixed therewith 1% of chloride of lime and 0.5% of selenium. If desired 1% of potassium or sodium chloride may also be introduced. The further treatment may be as set out in Example 1.

I claim:

1. Process of producing white Portland cement by adding substances giving off free chlorine to the raw material, consisting in mixing chloride of lime to the raw material, heating the mixture in a reducing atmosphere until sintering occurs and cooling it while excluding air.

2. Process of producing white Portland cement, consisting in mixing the usual raw material with chloride of lime, simultaneously adding a small amount of a flux like fluor spar, heating the mixture in a reducing atmosphere until sintering occurs and then cooling it while excluding air.

3. Process of producing white Portland cement, consisting in mixing the usual raw material with chloride of lime, simultaneously adding a small amount of selenium, adding a flux, heating the mixture in a reducing atmosphere until sintering occurs and cooling while air is excluded.

OTTO SCHWACHHEIM.